(12) United States Patent
Hamrin

(10) Patent No.: US 10,935,087 B2
(45) Date of Patent: Mar. 2, 2021

(54) CLUTCH ASSEMBLY

(71) Applicant: TEAM Industries, Inc., Bagley, MN (US)

(72) Inventor: John Edward Hamrin, Bemidji, MN (US)

(73) Assignee: TEAM Industries, Inc., Bagley, MN (US)

( * ) Notice: Subject to any disclaimer, the term of this patent is extended or adjusted under 35 U.S.C. 154(b) by 41 days.

(21) Appl. No.: 16/533,298

(22) Filed: Aug. 6, 2019

(65) Prior Publication Data

US 2020/0049211 A1 Feb. 13, 2020

Related U.S. Application Data

(60) Provisional application No. 62/716,263, filed on Aug. 8, 2018.

(51) Int. Cl.

| *F16D 25/10* | (2006.01) |
|---|---|
| *F16D 43/30* | (2006.01) |
| *F16D 41/064* | (2006.01) |
| F16D 41/06 | (2006.01) |
| F16D 23/12 | (2006.01) |

(52) U.S. Cl.
CPC .............. *F16D 43/30* (2013.01); *F16D 25/10* (2013.01); *F16D 41/064* (2013.01); *F16D 2023/123* (2013.01); *F16D 2041/0603* (2013.01); *F16D 2500/50875* (2013.01)

(58) Field of Classification Search
CPC ........ F16D 43/30; F16D 41/064; F16D 25/10; F16D 2041/0603; F16D 2500/50875; F16D 2023/123; F16D 13/74; F16D 13/52; F16D 41/069
See application file for complete search history.

(56) References Cited

U.S. PATENT DOCUMENTS

| 2002/0020596 | A1* | 2/2002 | Monahan | .............. | F16D 41/064 |
| | | | | | 192/35 |
| 2016/0298705 | A1* | 10/2016 | Davies | .................. | F16D 43/216 |
| 2017/0152947 | A1* | 6/2017 | Imafuku | ................. | B60K 17/34 |
| 2020/0256401 | A1* | 8/2020 | Barnes | .................... | F16D 23/12 |

* cited by examiner

*Primary Examiner* — David J Hlavka
(74) *Attorney, Agent, or Firm* — Fogg & Powers LLC

(57) ABSTRACT

A clutch assembly for driveline components is provided. The ball ramp having first and second ball ramp members and at least one ball is provided. The first ball ramp member of the ball ramp is in operational communication with an input member to the clutch assembly. A first set of plates of a clutch pack are in operational communication with the input member and a second set of plates of the clutch pack are in operational communication with an output member. A sprag clutch assembly that is operationally coupled to the second ball ramp member of the ball ramp, only allows the second ball ramp member of the ball ramp to rotate in first direction. A thrust bearing that is in operational communication with the second ball ramp member of the ball ramp selectively disengages the clutch pack when the output member rotates in a second direction.

20 Claims, 7 Drawing Sheets

CLUTCH ASSEMBLY

CROSS-REFERENCE TO RELATED APPLICATIONS

This Application claims priority to U.S. Provisional Application Ser. No. 62/716,263, same title herewith, filed on Aug. 8, 2018, which is incorporated in its entirety herein by reference.

BACKGROUND

Some vehicle driveline components, such as but not limited to, driveline components in a typical NuVinci continuously variable planetary (CVP) transmission, are not intended to rotate backwards due to inherent design instability that causes lockup issues. However, a transmission not having the ability to rotate backwards has limitations. For example, this type of driveline may not be used in vehicles that are designed to roll backwards at engine idle while in a forward gear selection. In this configuration, vehicle acceleration results in a positive driveline torque, while engine braking deceleration results in a negative torque, both with a positive rotation direction. In addition, some driveline components in vehicles may have significant inertia which contributes to damaging driveline torque spikes in transmissions that do not have the ability to rotate backwards. Hence, there is a desire to have driveline components that can deal with backwards rotation without having the limitations discussed above.

SUMMARY

The following summary is made by way of example and not by way of limitation. It is merely provided to aid the reader in understanding some of the aspects of the subject matter described. Embodiments provide a clutch assembly that is integrated into driveline components that addresses backward rotation lockup and inertia issues when utilizing transmission systems that traditionally are not designed to rotate backwards.

In one embodiment, a clutch assembly for driveline components that include a ball ramp, a clutch pack, a sprag clutch assembly and a thrust bearing is provided. The ball ramp has a first ball ramp member, a second ball ramp member and at least one ball. At least one of the first ball ramp member and the second ball ramp member includes at least one ball ramp helical surface groove. The at least one ball is received in an associated ball ramp helical surface groove of the at least one ball ramp helical surface groove. The first ball ramp member of the ball ramp is in operational communication to an input member to the clutch assembly. The clutch pack has a first set of plates and a second set of plates that are in an alternating position configuration. The first set of plates are in operational communication with the input member of the clutch assembly and the second set of plates are in operational communication with an output member of the clutch assembly. The sprag clutch assembly is operationally coupled to the second ball ramp member of the ball ramp to only allow the second ball ramp member of the ball ramp to rotate in first direction. The thrust bearing is in operational communication with the second ball ramp member of the ball ramp to selectively disengage the clutch pack when the output member rotates in a second direction.

In yet another embodiment, a clutch assembly including a central shaft, a carrier, a ring gear, an output member, a clutch pack, a ball ramp, a sprag clutch, a thrust bearing and at least one bias member is provided. At least a portion of a first portion of a transmission is mounted on the central shaft. The carrier is coupled to the central shaft. The carrier is operationally coupled to an output portion of the continuously variable transmission. The ring gear is in operational communication with the central shaft. The output member is configured to engage a transmission input shaft of a second portion of a transmission. The clutch pack has a first set of plates and a second set of plates that are in an alternating position configuration. The first set of plates are in operational communication with the ring gear and the second set of plates are in operational communication with the output member. The ball ramp has a first ball ramp member, a second ball ramp member and at least one ball. At least one of the first ball ramp member and the second ball ramp member includes at least one ball ramp helical surface groove. The at least one ball is received in an associated ball ramp helical surface groove. The sprag clutch assembly is operationally coupled to the second ball ramp member of the ball ramp to only allow the second ball ramp member of the ball ramp to rotate in a first direction. The thrust bearing is in operational communication with the second ball ramp member of the ball ramp to selectively disengage the clutch pack when the output member rotates in a second direction. The at least one bias member is positioned to provide a bias force on the thrust bearing to engage the clutch pack when the output member is not rotating in the second direction.

In still another embodiment a vehicle having a clutch assembly is provided. The vehicle includes a motor, a driveline and a clutch assembly. The driveline includes at least first portion of a transmission and a second portion of a transmission. The clutch assembly is positioned to interface torque between the first portion of the transmission and the second portion of the transmission. The clutch assembly includes a ball ramp, a clutch pack, a sprag clutch, thrust bearing. The ball ramp has a first ball ramp member, a second ball ramp member and at least one ball. At least one of the first ball ramp member and the second ball ramp member include at least one ball ramp helical surface groove. The at least one ball is received in an associated ball ramp helical surface groove of the at least one ball ramp helical surface groove. The first ball ramp member of the ball ramp is in operational communication to an input member of the first portion of the transmission. The clutch pack has a first set of plates and a second set of plates that are in an alternating position configuration. The first set of plates are in operational communication with the input member of the first portion of the transmission and the second set of plates are in operational communication with transmission input shaft of the second portion of the transmission. The sprag clutch assembly is operationally coupled to the second ball ramp member of the ball ramp to only allow the second ball ramp member of the ball ramp to rotate in first direction. The thrust bearing is in operational communication with the second ball ramp member of the ball ramp to selectively disengage the clutch pack when the transmission input shaft of the second portion rotates in a second direction.

BRIEF DESCRIPTION OF THE DRAWINGS

Embodiments can be more easily understood and further advantages and uses thereof will be more readily apparent, when considered in view of the detailed description and the following figures in which:

FIG. 6 FIG. 4 is a close up partial cross-sectional side view of the partial drivetrain of FIG. 3.

In accordance with common practice, the various described features are not drawn to scale but are drawn to emphasize specific features relevant to the subject matter described. Reference characters denote like elements throughout Figures and text.

DETAILED DESCRIPTION

In the following detailed description, reference is made to the accompanying drawings, which form a part hereof, and in which is shown by way of illustration specific embodiments in which the inventions may be practiced. These embodiments are described in sufficient detail to enable those skilled in the art to practice the embodiments, and it is to be understood that other embodiments may be utilized and that changes may be made without departing from the spirit and scope of the present invention. The following detailed description is, therefore, not to be taken in a limiting sense, and the scope of the present invention is defined only by the claims and equivalents thereof.

Embodiments provide a clutch assembly integrated with driveline components to addresses backward rotation lockup and inertia issues when utilizing transmission system that traditionally is not designed for backwards rotation. The terms "operational communication" and "operationally coupled" used herein may mean components are directly coupled to interact with each other or that there are additional components in between that interface the interaction between the components.

Figure 1:
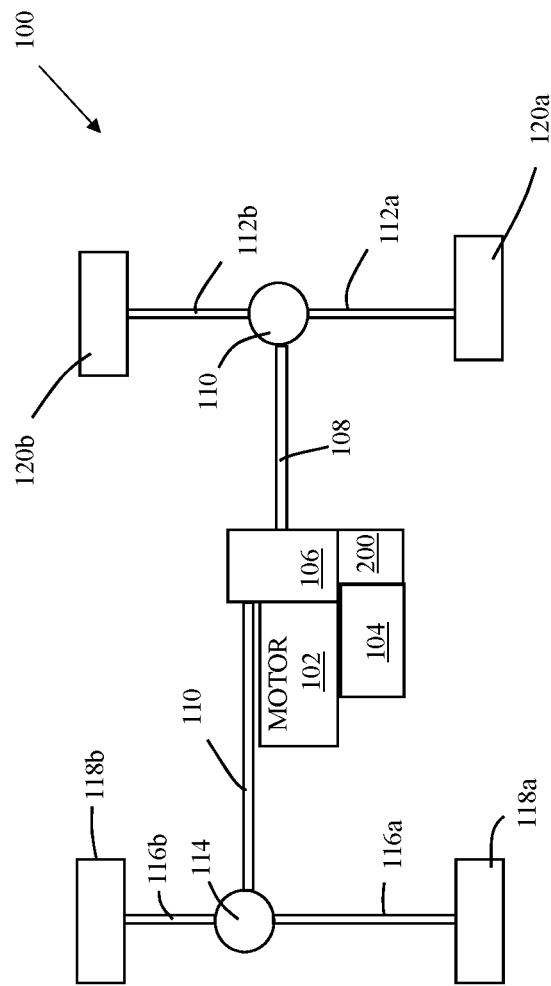
FIG. 1 illustrates a block diagram of vehicle implementing a clutch assembly according to one exemplary embodiment.

Referring to FIG. 1, a block diagram of an example vehicle 100 that implements a clutch assembly 200 of an embodiment is illustrated. The vehicle 100 in this embodiment includes an engine or motor 102 to generate engine torque. The motor 102 is in operational communication with a first part or portion of a transmission 104. Examples of the first portion of the transmission may be a continuously variable transmission, a continuously variable planetary transmission, etc. Further illustrated in FIG. 1 is a second portion of a transmission 106 which may include further gearing. In this example, the clutch assembly 200 provides and interface between the first part of the transmission 104 and the second part of the transmission 106. In other embodiments, the clutch assembly 200 may be positioned in a different locations.

Also illustrated in the vehicle of FIG. 1 are front prop or drive shaft 110 and rear prop or driveshaft 108. The front prop 110 communicatively couples torque and rotation between the second part of the transmission 106 and a front differential 114 and the rear prop shaft 108 couples torque and rotation between the second part of the transmission 106 and a rear differential 110. Front half shafts 116a and 116b couple torque and rotation between respective front wheels 118a and 118b and the front differential 114. Rear half shafts 112a and 112b couple torque between respective rear wheels 120a and 120b and the rear differential 114. Other configurations of vehicles may be used. For example at least a portion of the transmission may be part of a transaxle in an embodiment. Moreover, as discussed above, the clutch assembly 200 maybe be located in different location. The selected location, however, must be positioned to prevent backward rotation of portions of the transmission that are not designed to rotate in a backward rotational direction.

Figure 2:
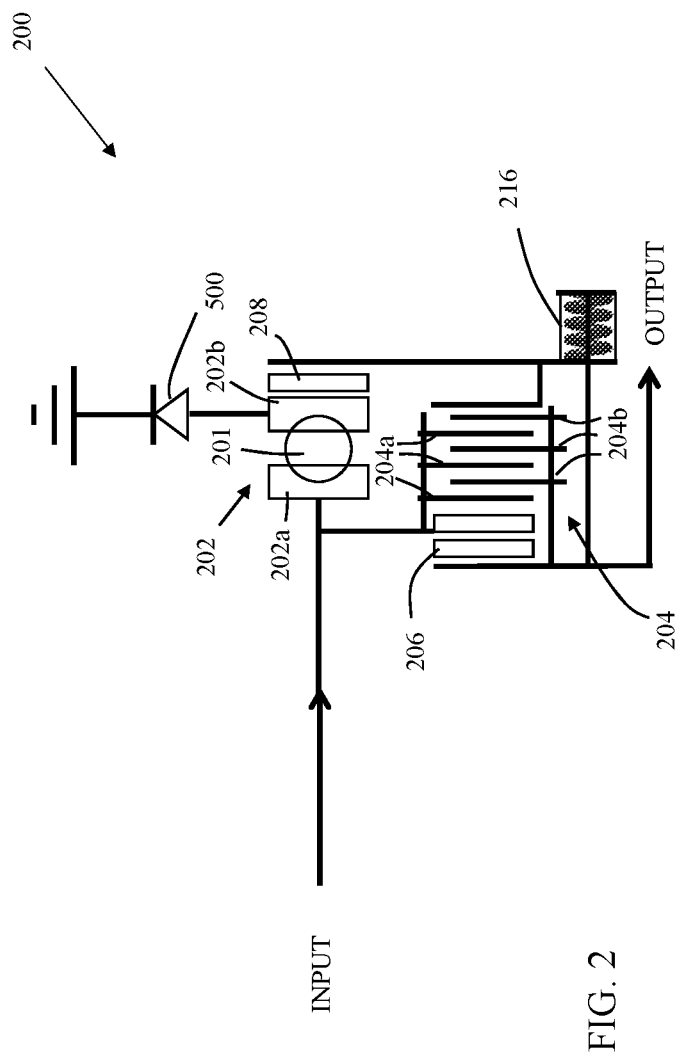
FIG. 2 illustrates a schematic diagram of a clutch assembly according to one exemplary embodiment.

FIG. 2 illustrated a schematic block diagram of a clutch assembly 200 of one embodiment. As illustrated in FIG. 2, an input (such as rotational torque that would be generated by an engine, such as engine 102 discussed above) from an input member is coupled to a first ball ramp member 202a of a ball ramp 202 that include a ramp ball 201. As illustrated the first ball ramp member 202a of the ball ramp 202 is in operational communication with a first set of plates 204a of a clutch pack 204. An output member of an output of the clutch assembly 200 is coupled to the second set of plates 204b. The output member is configured to be in operational communication with a portion of a drivetrain of the vehicle 100 such as the second portion of the transmission via transmission shaft as discussed below. The first and second sets of alternating plates 204a and 204b of the clutch pack 204 are positioned between thrust bearings 206 and 208. A sprag clutch assembly 500 is in operational communication with second ball ramp member 202b of the ball ramp 202. The sprag clutch assembly 500 only allows the second ball ramp member 202b of the ball ramp 202 to rotate in one direction.

During forward operation, bias member 216 which may be a spring 216 provides an axial force on the clutch pack 204. The axial force is provided in a set range, which in conjunction with the coefficient of friction of the plates 204a and 204b, provide a prescribed amount of torque transmission capacity which once exceeded, will result in slip. Thus, the clutch pack slip will limit the torque capacity of the device and protect the driveline from excessive torque, such as that resulting from inertial loading and rotational velocity changes. This is independent of the direction of the torque.

Figure 3:
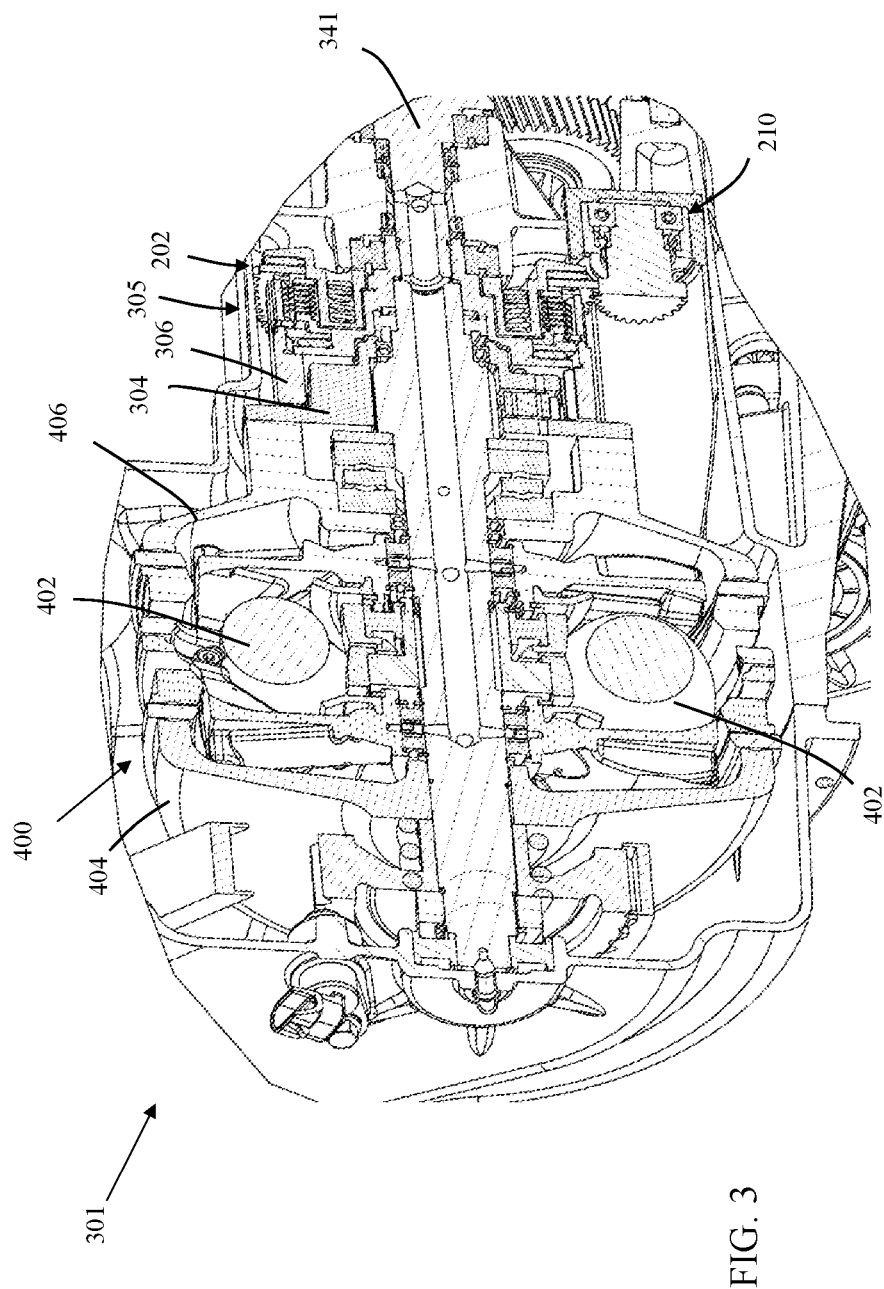
FIG. 3 is a cross-sectional side view of a partial drivetrain implementing a clutch assembly according to one exemplary embodiment.

During reverse operation, if the output rotates backwards, the input will rotate backwards as it is operatively coupled through the clutch pack 204. However, the sprag clutch assembly 500 prevents the second ball ramp member 202b of the ball-ramp 202 from rotating. Thus, one-half of the ball-ramp (first ball ramp member 202a) will rotate while the other half (second ball ramp member 202b) will not, and therefore the ball-ramp 202 will exert an axial force against the thrust bearing 208. If the reverse rotation continues against the axial force of the spring 216 to the point of exceeding the spring force, the clutch pack 204 will open up and disengage. Once the clutch pack 204 is open, the connection between the output and the input via the clutch pack is disconnected. In one embodiment, it is the operational connection between the output and a ring gear 306 (that is in operational communication with in the input) is lost and the ring gear 306 will stop rotating. An example of ring gear is illustrated in FIG. 3. The resistive drag of the thrust bearing 208 will bias the ball-ramp 202 to remain in this state until forward motion of either the input is initiated by the engine 102 or the vehicle 100 starts to roll forward due to external forces such as the inclination of the vehicle operating surface causing forward rotation of the output member.

FIGS. 3 through 6 illustrates cross-sectional views of partial drivetrain components 301 (generally referred to a driveline components 301) implementing a clutch assembly 300 of an example embodiment. FIG. 3 illustrates the driveline components in this example embodiment includes a NuVinci continuously variable planetary (CVP) transmission portion 400. In other embodiments, other types of transmission may be used. The CVP transmission portion 400 includes balls 402 that are engaged on one side by an input disk assembly 404 (or input cam driver) and another side by an output disk assembly 406 (or output cam driver). The input disk assembly 404 is operationally coupled to receive torque generated from a motor, such as engine 102 discussed above. The rotation and torque of the input disk assembly cause rotation of the balls 402 which interfaces the rotation and torque to the output disk assembly 406. A rotation axis of the balls 402 is changed to adjust the ratio of input to output speed. The output disk assembly 406 (or output cam driver 406) is operationally coupled to a carrier 304 to transfer torque to the carrier 304.

The driveline components 301 illustrated in FIG. 3 further includes a ring gear 306, a clutch pack 305, a ball ramp 202 and a sprag clutch assembly 500. The ring gear 306 is coupled to the carrier 304. The clutch pack 305 in this example embodiment is positioned to selectively couple torque between a transmission input shaft 341 and the ring gear 306 as discussed in detail below. The sprag clutch assembly 500 prevents the clutch pack 305 from transmitting reverse rotation in excess of a ball ramp engagement travel of the ball ramp 202 to the ring gear 306 and thus to the output disk assembly 406.

Figure 4:
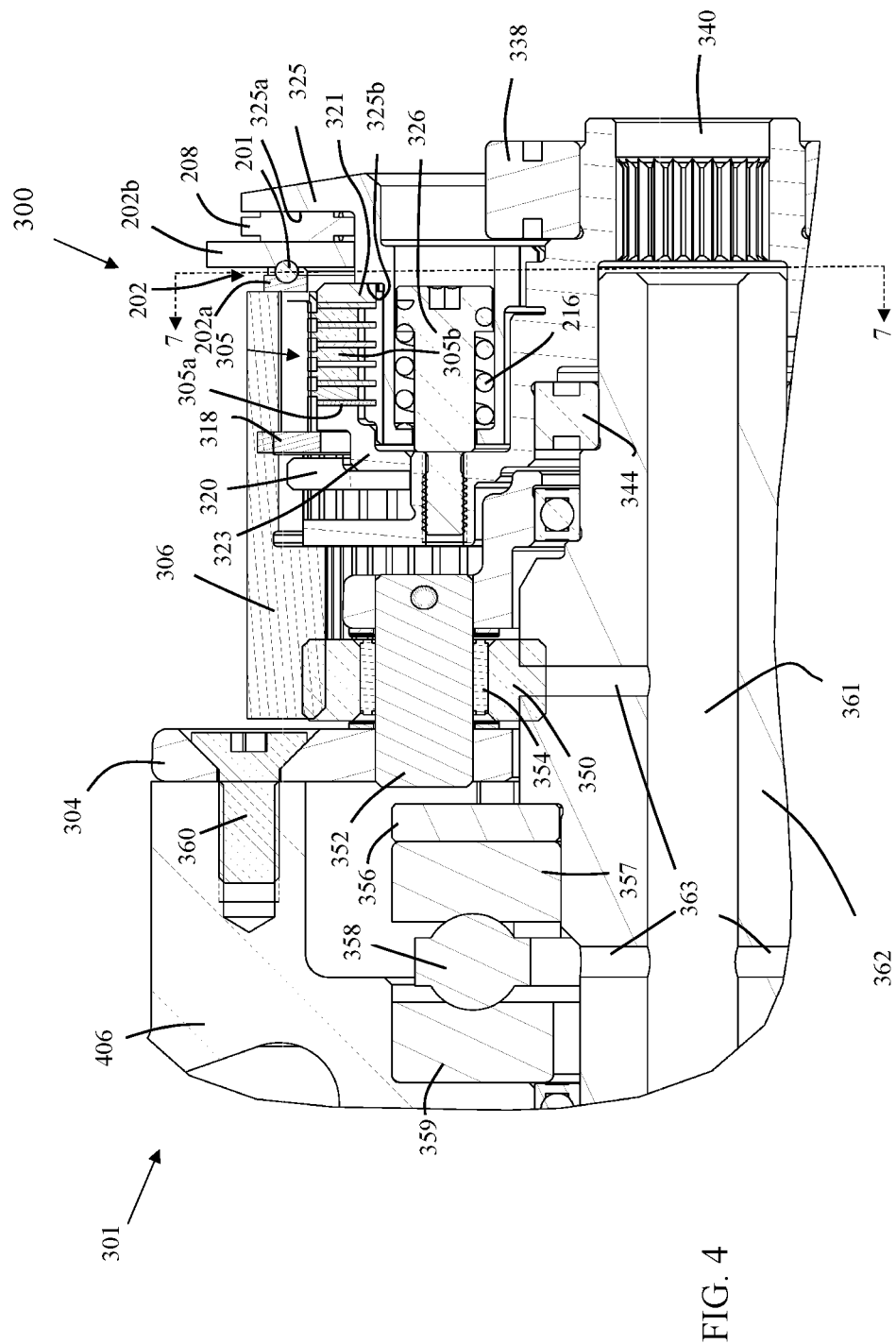
FIG. 4 is a close up cross-sectional side view of the partial drivetrain of FIG. 3.
Figure 5:
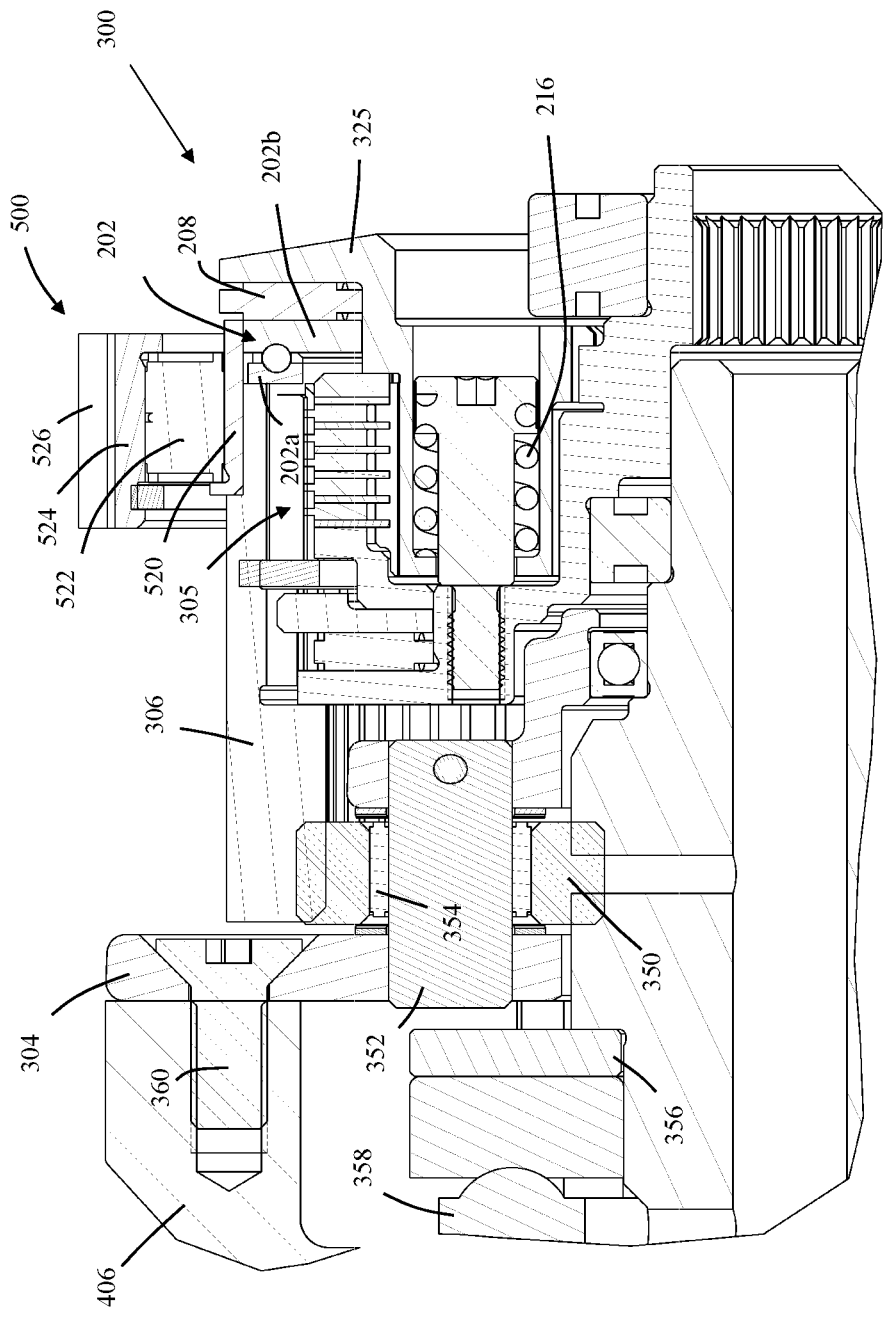
FIG. 5 is a close up cross-sectional side view of the partial drivetrain of FIG. 3.

Referring to FIGS. 4 and 5, close up views of the partial driveline 301 is illustrated. These close up views illustrate the carrier 304 is coupled to the output cam driver 406 via fastener 360. Although only one fastener 360 is illustrated in this view, a plurality of fasteners may be used to couple the carrier 304 to the output cam driver 406. The clutch pack 305 includes a first set of plates 305a that are operationally coupled to an output (that includes output member 340 in this example) and a second set plates 305b operationally coupled to an input member (that includes carrier 304 in this example). The output member 340 is coupled to the transmission input shaft 341. An output bearing 338 is positioned to support the output member 340.

The ball ramp 202 is also illustrated in FIG. 4. The ball ramp 202 includes the ramp ball 201, and the first and second ball ramp members 202a and 202b of the ball ramp 202. Further illustrated is the thrust bearing 208. The thrust bearing 208 is sandwiched between the second ball ramp member 202b of the ball ramp 202 and portion of a pressure plate 325. The pressure plate 325 in this example embodiment, includes a first shoulder portion 325a that engages the thrust bearing 208 and a second shoulder portion 325b that engages a thrust washer 321 of the clutch pack 305.

The clutch assembly 300 further includes a shoulder bolt 326 and bias member 216 arrangement. The bias member 216 is positioned to exert a select force on the pressure plate 325, which in turn, provides a select force on the thrust washer 321 of the clutch pack 305. This provides a torque transfer interface between the input and output in a downstream (forward) direction under normal conditions. As discussed above, the biasing force of the bias member is selected so that if a torque force beyond what the system is designed to handle is encountered, the clutch pack 305 slips to protect the drivetrain components. Although only one shoulder bolt 326 and bias member 216 arrangement is illustrated in FIG. 4, a plurality of such arrangements employed in this embodiment.

A bearing 344 is positioned to support a central shaft 362 or central post. In particular, bearing 344 is positioned between the central shaft 362 and a portion of the output member 340. Further illustrated in the embodiment of FIG. 4 is a planet gear 350 that couples rotation and torque between the central shaft 362 and the ring gear 306. The planet gear 350 is mounted on an axle pin 352. A needle bearing 354 is positioned between the axle pin 352 and the planet rear 350 so the planate gear 350 is free to rotate in relation to the axle pin 352. Further illustrated is a thrust washer 356 and a thrust bearing 358. The thrust washer 356 supports the thrust bearing 358 which provides an internal force to the CVP transmission portion 400. Raceways 357 and 359 are engaged with the thrust bearing 358. Also illustrated are fluid passages 363 from a central fluid passage 361 of the central shaft 362 used to provide a fluid, such as an oil, to the internal components of the partial driveline 301.

Figure 6:
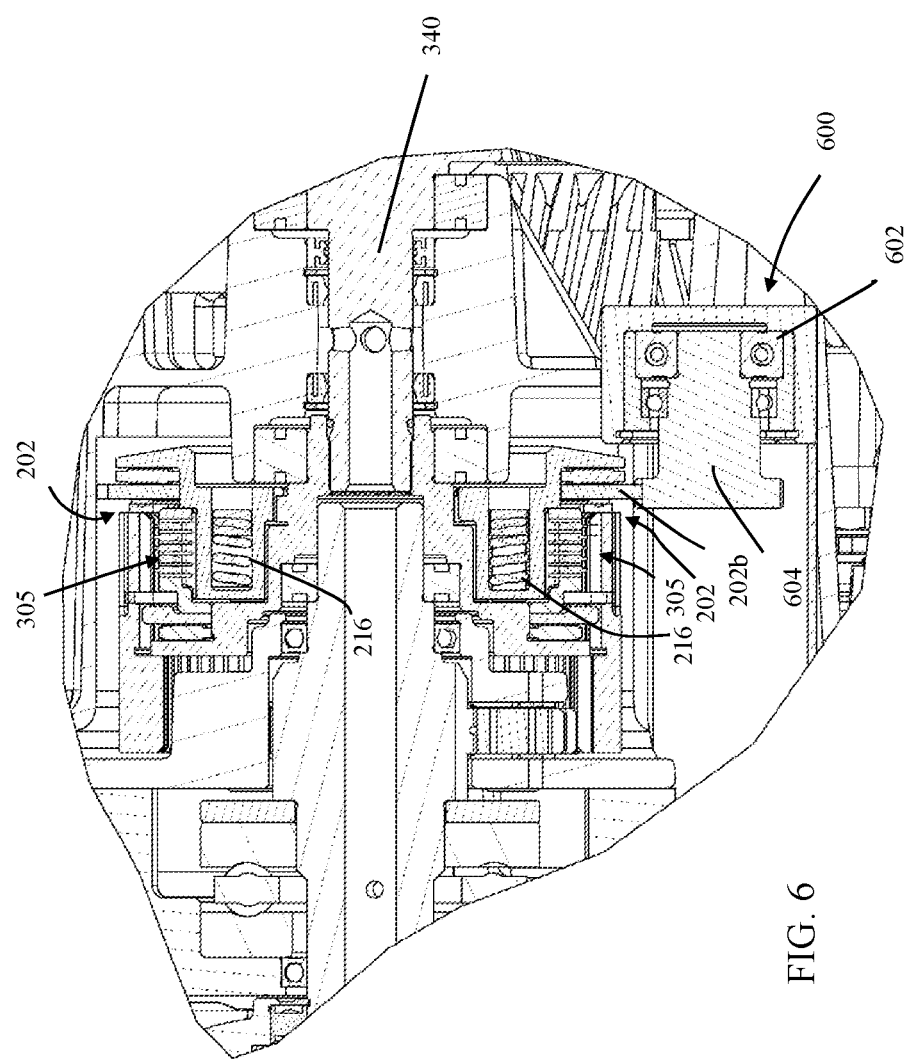

FIG. 5 further illustrates the clutch assembly 300 includes a sprag clutch assembly 500. The sprag clutch assembly 500 includes a transmission housing coupler 526, a sprag clutch outer race 524, a sprag clutch bearing 522 and a sprag clutch inner race 520. The sprag clutch bearing 522 is a one-way bearing that only allows rotation in one direction. FIG. 6 illustrates another example embodiment of a sprag clutch assembly 600. As illustrated, the sprag clutch assembly 600 in this example includes a sprag clutch 602 (one-way bearing) that is engaged to an integrated sprag gear/shaft assembly 604. The sprag clutch 602 rotates freely on the gear/shaft assembly 604 in a first direction and locks on to the gear/shaft assembly 604 in a second direction. The gear portion of the gear/shaft assembly 604 is selectively engaged with the second ball ramp member 202b of the ball ramp 202. FIG. 6 further illustrates that the embodiment of the clutch assembly 300 includes a plurality of ball ramps 202, clutch packs 204 and bias members 216. An embodiment may include a sprag clutch assembly 600 for each ball ramp 202.

Figure 7:
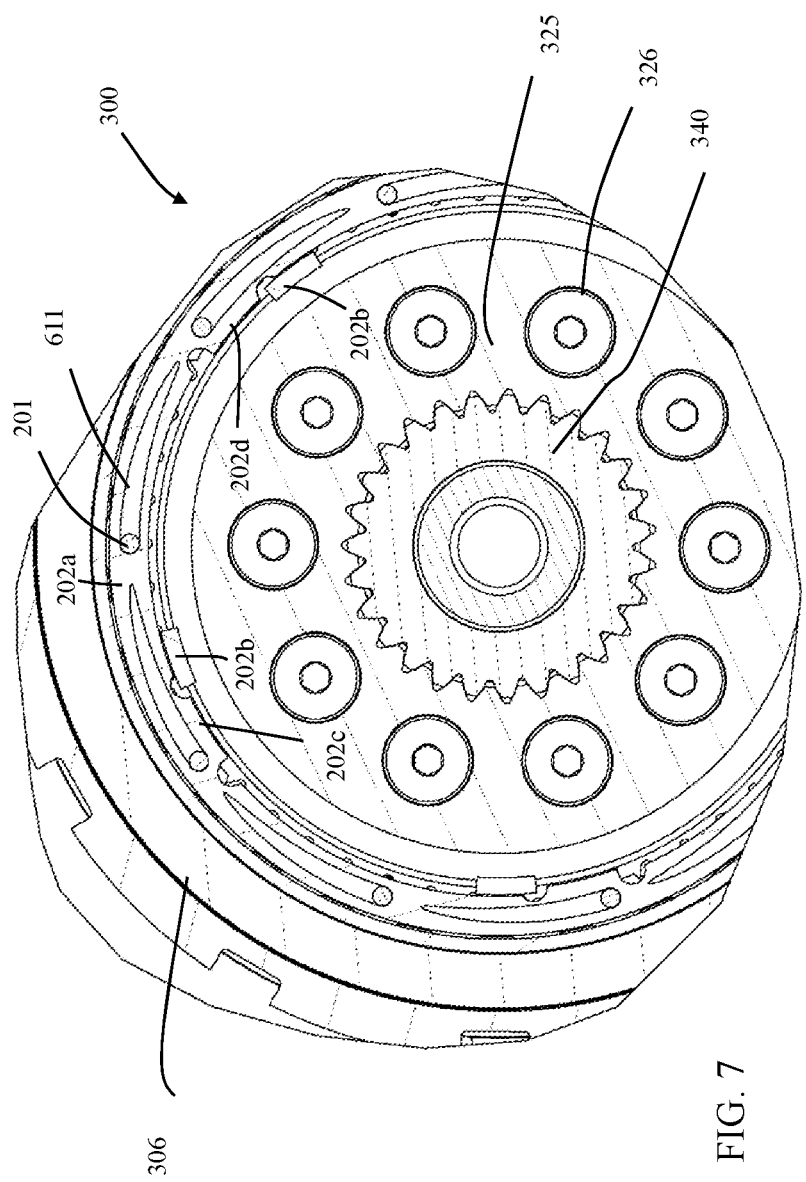
FIG. 7 is a cross-sectional end view along line 7_7 of FIG. 4 of the partial driveline of FIG. 3.

FIG. 7 illustrates a front partial cross-section view of the clutch assembly 300 along line 7_7 of FIG. 4. In particular, FIG. 7 illustrates the ring gear 306, pressure plate 325, shoulder bolts 326 and output member 340. Also illustrated in FIG. 7 are ball ramp helical surface grooves 611 formed in at least the first ball ramp member 202a of the ball ramp 202. As illustrated, the balls 201 are received with their respective ball ramp helical surface groove 611. In other embodiments, the second ball ramp member 202b may include the ball ramp helical surface grooves 611. In further other embodiments, both the first ball ramp member 202a and the second ball ramp member 202b include ball ramp helical surface grooves 611 in which the balls 201 are received. When the first ball ramp member 202a and the second ball ramp member 202b of the ball ramp 202 rotates in relation to each other, the balls 201 move in the ball ramp helical surface grooves 611. As the balls 201 move up the respective ball ramp helical surface grooves 611 in a first direction the second ball ramp member 202b is moved away from the first ball ramp member 202a of the ball ramp 202 asserting a force on the thrust bearing 208. Further when the first ball ramp member 202a and the second ball ramp member 202b move in relation to each other in the opposite second direction, the balls 201 move back causing the second ball ramp member 202b to move back towards the first ball ramp member 202a. Further illustrated in FIG. 7 are ball ramp travel limit stops 202c and 202d that limit the rotation of the first ball ramp member 202a and the second ball ramp member 202b in relation to each other.

During forward (first direction) operation, the one or more bias members 216 provides an axial force on the clutch pack 305. As discussed above, the clutch pack 305 consists of alternating plates 305a and 305b. The first set of plates 204a are in operational communication with output member 340 of the driveline assembly 301 and the second set of plates 204b are in operational communication with the carrier 304 (input member) of the driveline components 301. Axial force is provided in a set range, which in conjunction with the coefficient of friction of the plates 204a and 204b, provide a prescribed amount of torque transmission capacity which once exceeded, will result in slip. Thus, the clutch pack slip will limit the torque capacity of the driveline components 301 and protect the driveline from excessive torque, such as that resulting from inertial loading and rotational velocity changes. This is independent of the direction of the torque.

If the output 340 rotates backwards (second direction), the ring gear 306 will rotate backwards as it is operatively connected from the output 340 to pressure plate 325 to ring gear 306 through the clutch pack 305. However, the sprag clutch 502 or 602 (best illustrated in FIGS. 5 and 6) or one-way bearing of the sprag clutch assembly 500 or 600 prevents the second ball ramp member 202b (second half) of the ball-ramp 202 from rotating (as best illustrated in FIGS. 5 and 6). Thus, one-half (first ball ramp member 202a of the ball-ramp 202 will rotate while the other half (second ball ramp member 202b) will not, and therefore the ball-ramp 202 will exert an axial force against the thrust bearing 208 (as best illustrated in FIG. 5) that, in turn, will exert an axial force against pressure plate 325. If the reverse rotation continues against the axial force of the springs 216 to the point of exceeding the spring or bias force, the clutch pack 305 will open up and disengage. Once the clutch pack 305 is open, the connection between the output 340 and the ring gear 306 is lost and the ring gear 306 will stop rotating. The resistive drag of the thrust bearing 208 will bias the ball-ramp 202 to remain in this state until forward motion of either the ring gear 306 is initiated by the engine 102 or the vehicle 100 starts to roll forward due to external forces such as the inclination of the vehicle operating surface causing forward rotation of pressure plate 325. In one embodiment, the inner clutch plates 204b are splined to pressure plate 325. This embodiment may reduce sliding friction under torque load.

EXAMPLE EMBODIMENTS

Example 1 is a clutch assembly for driveline components that include a ball ramp, a clutch pack, a sprag clutch assembly and a thrust bearing. The ball ramp has a first ball ramp member, a second ball ramp member and at least one ball. At least one of the first ball ramp member and the second ball ramp member includes at least one ball ramp helical surface groove. The at least one ball is received in an associated ball ramp helical surface groove of the at least one ball ramp helical surface groove. The first ball ramp member of the ball ramp is in operational communication to an input member to the clutch assembly. The clutch pack has a first set of plates and a second set of plates that are in an alternating position configuration. The first set of plates are in operational communication with the input member of the clutch assembly and the second set of plates are in operational communication with an output member of the clutch assembly. The sprag clutch assembly is operationally coupled to the second ball ramp member of the ball ramp to only allow the second ball ramp member of the ball ramp to rotate in first direction. The thrust bearing is in operational communication with the second ball ramp member of the ball ramp to selectively disengage the clutch pack when the output member rotates in a second direction.

Example 2, includes the clutch assembly of Example 1, further including at least one bias member positioned to provide a bias force on the thrust bearing to engage the clutch pack when the output member is not rotating in the backwards direction.

Example 3 includes the clutch assembly of any of the Examples 1-2, further including a pressure plate having a first portion that is engaged with the thrust bearing and a second portion that is operationally coupled to the clutch pack.

Example 4 includes the clutch assembly of Examples 3, further including a thrust washer position between the second ball ramp member of the pressure plate and the clutch pack.

Example 5 includes the clutch assembly of any of the Examples 1-4, further including a shoulder bolt for each bias member. Each bias member is mounted on an associated shoulder bolt.

Example 6 includes the clutch assembly of any of the Examples 1-5, wherein the input member of the clutch assembly includes a carrier.

Example 7 includes the clutch assembly of Example 6, further including a central shaft that is in operational communication with the carrier, a planet gear that is engaged with the central shaft and a ring gear that is engaged with the planet gear. The ring gear is further coupled to the first set of plates of the clutch pack.

Example 8 includes the clutch assembly of Example 6, wherein the input member further comprises an output disc assembly of a variable transmission, the output disc assembly coupled to the carrier.

Example 9 includes the clutch assembly of any of the Examples 1-8, wherein the output member is configured to engage a transmission input shaft.

Example 10 includes the clutch assembly of any of the Examples 1-9, wherein the sprag clutch assembly includes a one-way bearing.

Example 11 includes a clutch assembly including a central shaft, a carrier, a ring gear, an output member, a clutch pack, a ball ramp, a sprag clutch, a thrust bearing and at least one bias member. At least a portion of a first portion of a transmission is mounted on the central shaft. The carrier is coupled to the central shaft. The carrier is operationally coupled to an output portion of the continuously variable transmission. The ring gear is in operational communication with the central shaft. The output member is configured to engage a transmission input shaft of a second portion of a transmission. The clutch pack has a first set of plates and a second set of plates that are in an alternating position configuration. The first set of plates are in operational communication with the ring gear and the second set of plates are in operational communication with the output member. The ball ramp has a first ball ramp member, a second ball ramp member and at least one ball. At least one of the first ball ramp member and the second ball ramp member includes at least one ball ramp helical surface groove. The at least one ball is received in an associated ball ramp helical surface groove. The sprag clutch assembly is operationally coupled to the second ball ramp member of the ball ramp to only allow the second ball ramp member of the ball ramp to rotate in a first direction. The thrust bearing is in operational communication with the second ball ramp member of the ball ramp to selectively disengage the clutch pack when the output member rotates in a second direction. The at least one bias member is positioned to provide a bias force on the thrust bearing to engage the clutch pack when the output member is not rotating in the second direction.

Example 12 includes the clutch assembly of Examples 11, further including a pressure plate that has a first portion that is engaged with the thrust bearing and a second portion that is operationally coupled to the clutch pack.

Example 13 includes the clutch assembly of Example 12, further including a thrust washer position between the second ball ramp member of the pressure plate and the clutch pack.

Example 14 includes the clutch assembly of any of the Examples 11-13, further including a shoulder bolt for each bias member. Each bias member is mounted on an associated shoulder bolt.

Example 15 includes the clutch assembly of any of the Examples 11-14, wherein the sprag clutch assembly includes a one-way bearing.

Example 16 includes a vehicle having a clutch assembly. The vehicle includes a motor, a driveline and a clutch assembly. The driveline includes at least first portion of a transmission and a second portion of a transmission. The clutch assembly is positioned to interface torque between the first portion of the transmission and the second portion of the transmission. The clutch assembly includes a ball ramp, a clutch pack, a sprag clutch, thrust bearing. The ball ramp has a first ball ramp member, a second ball ramp member and at least one ball. At least one of the first ball ramp member and the second ball ramp member include at least one ball ramp helical surface groove. The at least one ball is received in an associated ball ramp helical surface groove of the at least one ball ramp helical surface groove. The first ball ramp member of the ball ramp is in operational communication to an input member of the first portion of the transmission. The clutch pack has a first set of plates and a second set of plates that are in an alternating position configuration. The first set of plates are in operational communication with the input member of the first portion of the transmission and the second set of plates are in operational communication with transmission input shaft of the second portion of the transmission. The sprag clutch assembly is operationally coupled to the second ball ramp member of the ball ramp to only allow the second ball ramp member of the ball ramp to rotate in first direction. The thrust bearing is in operational communication with the second ball ramp member of the ball ramp to selectively disengage the clutch pack when the transmission input shaft of the second portion rotates in a second direction.

Example 17 includes the vehicle of Example 16, wherein the driveline further includes a front differential in operational communication with the second portion of the transmission via front prop shaft; a pair of front wheels in operational communication with the front differential via pair of front half shafts; a rear differential in operational communication with the second portion of the transmission via rear prop shaft; and a pair of rear wheels in operational communication with the rear differential via pair of rear half shafts.

Example 18 includes the vehicle of any of the Examples 16-17, wherein the clutch assembly further includes at least one bias member, a pressure plate and a trust washer. The at least one bias member is positioned to provide a bias force on the thrust bearing to engage the clutch pack when the output member is not rotating in the second direction. The pressure plate has a first portion that is engaged with the thrust bearing and a second portion that is operationally coupled to the clutch pack. The thrust washer is positioned between the second ball ramp member of the pressure plate and the clutch pack.

Example 19 includes the vehicle of any of the Examples 16-18, wherein the clutch assembly further includes a central shaft, a planet gear and a ring gear. The central shaft is in operational communication with a carrier. The planet gear is engaged with the central shaft. The ring gear is engaged with the planet gear. The ring gear is further coupled to the first set of plates of the clutch pack.

Example 20 includes the vehicle of any of the Examples 16-20, wherein the input member of the first portion of the transmission further comprises an output disc assembly of a variable transmission.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. A clutch assembly for driveline components comprising:
    a ball ramp having a first ball ramp member, a second ball ramp member and at least one ball, at least one of the first ball ramp member and the second ball ramp member including at least one ball ramp helical surface groove, the at least one ball received in an associated ball ramp helical surface groove of the at least one ball ramp helical surface groove, the first ball ramp member of the ball ramp in operational communication to an input member to the clutch assembly;
    a clutch pack having a first set of plates and a second set of plates that are in an alternating position configuration, the first set of plates in operational communication with the input member of the clutch assembly and the second set of plates in operational communication with an output member of the clutch assembly;
    a sprag clutch assembly operationally coupled to the second ball ramp member of the ball ramp to only allow the second ball ramp member of the ball ramp to rotate in a first direction; and
    a thrust bearing in operational communication with the second ball ramp member of the ball ramp to selectively disengage the clutch pack when the output member rotates in a second direction.

2. The clutch assembly of claim 1, further comprising:
    at least one bias member positioned to provide a bias force on the thrust bearing to engage the clutch pack when the output member is not rotating in the second direction.

3. The clutch assembly of claim 1, further comprising:
    a pressure plate having a first portion that is engaged with the thrust bearing and a second portion that is operationally coupled to the clutch pack.

4. The clutch assembly of claim 3, further comprising:
    a thrust washer position between the second ball ramp member of the pressure plate and the clutch pack.

5. The clutch assembly of claim 1, further comprising:
    a shoulder bolt for each bias member, each bias member mounted on an associated shoulder bolt.

6. The clutch assembly of claim 1, wherein the input member of the clutch assembly includes a carrier.

7. The clutch assembly of claim 6, further comprising:
a central shaft in operational communication with the carrier;
a planet gear engaged with the central shaft; and
a ring gear engaged with the planet gear, the ring gear further coupled to the first set of plates of the clutch pack.

8. The clutch assembly of claim 6, wherein the input member further comprises an output disc assembly of a variable transmission, the output disc assembly coupled to the carrier.

9. The clutch assembly of claim 1, wherein the output member is configured to engage a transmission input shaft.

10. The clutch assembly of claim 1, wherein the sprag clutch assembly includes a one-way bearing.

11. A clutch assembly comprising:
a central shaft, at least a portion of a first portion of a transmission mounted on the central shaft;
a carrier coupled to the central shaft, the carrier operationally coupled to an output portion of the continuously variable transmission;
a ring gear in operational communication with the central shaft;
an output member configured to engage a transmission input shaft of a second portion of a transmission;
a clutch pack having a first set of plates and a second set of plates that are in an alternating position configuration, the first set of plates in operational communication with the ring gear and the second set of plates in operational communication with the output member;
a ball ramp having a first ball ramp member, a second ball ramp member and at least one ball, at least one of the first ball ramp member and the second ball ramp member including at least one ball ramp helical surface groove, the at least one ball received in an associated ball ramp helical surface groove;
a sprag clutch assembly operationally coupled to the second ball ramp member of the ball ramp to only allow the second ball ramp member of the ball ramp to rotate in a first direction;
a thrust bearing in operational communication with the second ball ramp member of the ball ramp to selectively disengage the clutch pack when the output member rotates in a second direction; and
at least one bias member positioned to provide a bias force on the thrust bearing to engage the clutch pack when the output member is not rotating in the backwards direction.

12. The clutch assembly of claim 11, further comprising:
a pressure plate having a first portion that is engaged with the thrust bearing and a second portion that is operationally coupled to the clutch pack.

13. The clutch assembly of claim 12, further comprising:
a thrust washer position between the second ball ramp member of the pressure plate and the clutch pack.

14. The clutch assembly of claim 11, further comprising:
a shoulder bolt for each bias member, each bias member mounted on an associated shoulder bolt.

15. The clutch assembly of claim 11, wherein the sprag clutch assembly includes a one-way bearing.

16. A vehicle including a clutch assembly, the vehicle comprising:
a motor,
a driveline including,
at least first portion of a transmission and a second portion of a transmission;
a clutch assembly positioned to interface torque between the first portion of the transmission and the second portion of the transmission, the clutch assembly including,
a ball ramp having a first ball ramp member, a second ball ramp member and at least one ball, at least one of the first ball ramp member and the second ball ramp member including at least one ball ramp helical surface groove, the at least one ball received in an associated ball ramp helical surface groove of the at least one ball ramp helical surface groove, the first ball ramp member of the ball ramp in operational communication to an input member of the first portion of the transmission,
a clutch pack having a first set of plates and a second set of plates that are in an alternating position configuration, the first set of plates in operational communication with the input member of the first portion of the transmission and the second set of plates in operational communication with transmission input shaft of the second portion of the transmission,
a sprag clutch assembly operationally coupled to the second ball ramp member of the ball ramp to only allow the second ball ramp member of the ball ramp to rotate in first direction, and
a thrust bearing in operational communication with the second ball ramp member of the ball ramp to selectively disengage the clutch pack when the transmission input shaft of the second portion rotates in a second direction.

17. The vehicle of claim 16, wherein the driveline further comprises:
a front differential in operational communication with the second portion of the transmission via front prop shaft;
a pair of front wheels in operational communication with the front differential via pair of front half shafts;
a rear differential in operational communication with the second portion of the transmission via rear prop shaft; and
a pair of rear wheels in operational communication with the rear differential via pair of rear half shafts.

18. The vehicle of claim 16, wherein the clutch assembly further comprises:
at least one bias member positioned to provide a bias force on the thrust bearing to engage the clutch pack when the output member is not rotating in the second direction;
a pressure plate having a first portion that is engaged with the thrust bearing and a second portion that is operationally coupled to the clutch pack; and
a thrust washer positioned between the second ball ramp member of the pressure plate and the clutch pack.

19. The vehicle of claim 16, wherein the clutch assembly further comprises
a central shaft in operational communication with a carrier;
a planet gear engaged with the central shaft; and
a ring gear engaged with the planet gear, the ring gear further coupled to the first set of plates of the clutch pack.

20. The vehicle of claim 16, wherein the input member of the first portion of the transmission further comprises an output disc assembly of a variable transmission.

* * * * *